(12) United States Patent
Van Druten et al.

(10) Patent No.: US 8,235,857 B2
(45) Date of Patent: Aug. 7, 2012

(54) GEAR MODULE

(75) Inventors: Marie Roell Van Druten, Eindhoven (NL); Bas Gerard Vroemen, Eindhoven (NL); Alexander Franciscus Anita Serrarens, Eindhoven (NL)

(73) Assignee: DTI Group B.V., Eindhoven (NL)

( * ) Notice: Subject to any disclaimer, the term of this patent is extended or adjusted under 35 U.S.C. 154(b) by 996 days.

(21) Appl. No.: 11/996,064

(22) PCT Filed: Jul. 18, 2006

(86) PCT No.: PCT/NL2006/000372
§ 371 (c)(1),
(2), (4) Date: Jun. 16, 2008

(87) PCT Pub. No.: WO2007/011211
PCT Pub. Date: Jan. 25, 2007

(65) Prior Publication Data
US 2008/0282824 A1 Nov. 20, 2008

(30) Foreign Application Priority Data

| Jul. 18, 2005 | (NL) | 1029551 |
| Oct. 21, 2005 | (NL) | 1030240 |
| Dec. 5, 2005 | (NL) | 1030590 |
| Mar. 1, 2006 | (NL) | 1031265 |
| Apr. 6, 2006 | (NL) | 1031527 |

(51) Int. Cl.
*F16H 37/08* (2006.01)

(52) U.S. Cl. ............... 475/198; 475/207; 475/343

(58) Field of Classification Search ............ 475/198, 475/207, 218, 220, 269, 296, 302, 317, 321, 475/343; 192/3.52, 85.51, 85.49, 85.53, 192/85.59
See application file for complete search history.

(56) References Cited

U.S. PATENT DOCUMENTS

| 3,767,015 A | * | 10/1973 | Odier ........................... 188/71.6 |
| 3,772,940 A | * | 11/1973 | Ohtsuka et al. ............... 475/144 |
| 4,368,650 A | * | 1/1983 | Numazawa et al. .......... 475/136 |
| 4,474,268 A | * | 10/1984 | Dayen ........................ 188/71.5 |
| 5,103,942 A | * | 4/1992 | Schmitt ..................... 188/251 R |
| 5,143,190 A | * | 9/1992 | Westendorf et al. ....... 192/70.27 |
| 5,888,161 A | * | 3/1999 | McCarrick et al. ........... 475/43 |
| 6,360,853 B1 | * | 3/2002 | Maxwell et al. ............. 188/72.5 |
| 6,505,504 B1 | * | 1/2003 | Chang et al. ............... 73/114.15 |
| 7,059,453 B2 | * | 6/2006 | Yamamoto et al. .......... 188/71.5 |
| 7,182,709 B2 | * | 2/2007 | Christ et al. ................. 475/348 |
| 7,229,379 B2 | * | 6/2007 | Antonov et al. ............. 475/258 |
| 7,410,442 B2 | * | 8/2008 | Fox ............................. 475/343 |
| 2001/0030094 A1 | * | 10/2001 | Pareti ....................... 188/250 R |

FOREIGN PATENT DOCUMENTS

| WO | WO 03047898 A1 * | 6/2003 |
| WO | WO 2004/098937 | 5/2004 |

\* cited by examiner

*Primary Examiner* — Justin Holmes
(74) *Attorney, Agent, or Firm* — Eric Karich (57) ABSTRACT

A drive has a drive source connected with an automatic manual gearbox. A friction clutch is positioned between the drive source and the gearbox. The drive also has a differential, which with a gear wheel engages a first gear wheel on the gearbox output shaft, as well as a gear module to change the transmission in the gear without interrupting the drive. The gear module has a brake and a bypass transmission with three rotation bodies of which a first rotation body is connected to the first clutch part, a second rotation body is connected to a connecting gear wheel, which engages the first gear wheel, and the third rotation body is connected to the brake. The connections of the rotation bodies to the parts stated and respectively of the drive are made in this as splines.

39 Claims, 8 Drawing Sheets

GEAR MODULE

BACKGROUND OF THE INVENTION

1. Field of the Invention

The invention relates to a gear module usable in a drive.

2. Description of Related Art

A prior art gear module is shown in the international patent application WO 2004/000314 A1. Using this known gear module in a drive as described above enables the transmission in the gear to be changed without interrupting the drive line between the drive source and the driven wheels. The disadvantage of this known gear module is that the incorporation of this gear module in an existing drive or the removal of the gear module for maintenance is very laborious.

SUMMARY OF THE INVENTION

The present invention teaches certain benefits in construction and use which give rise to the objectives described below.

The present invention provides a drive that includes a drive source and an automatic gearbox connected to it with an input and an output shaft. A friction clutch is present between the drive source and the gearbox input shaft, and a differential is connected to a first gear wheel present on the gearbox output shaft. The clutch includes a first clutch part is connected to the drive source and the second clutch part connected to, and can be disconnected from, the gearbox input shaft (i.e. is disconnectably connected). The gear module comprises a brake, as well as a bypass transmission with three rotation bodies, of which a first rotation body can be connected via first connection devices to the first clutch part, a second rotation body can be connected to the first gear wheel, and the third rotation body is connected to the brake.

An automatic gearbox is here defined as a gearbox that is provided with different gear wheel pairs between the input and output shaft to achieve different transmission ratios, by which an arm can be moved to connect a single gear wheel of one of the gear wheel pairs to the corresponding shaft as desired, and in which the arm is moved automatically.

This gear module serves to change the transmission in the gear without interrupting the drive.

An objective of the invention is to provide a gear module which can be easily incorporated in and removed from a drive. For this purpose, the drive according to the invention is characterized in that the gear module comprises a connecting gear wheel that can be made to engage the first gear wheel of the drive and which is disconnectably connected to the second rotation body via second connection devices. A very compact and simple clutch is obtained with the drive by allowing the connecting gear wheel to work directly with the first gear wheel and not connecting it to the first gear wheel.

The connecting gear wheel may be connected on bearings to a bush, which is fastened to a drive gearbox housing when using the gear module in a drive concentric to an input shaft.

The bush may be part of a gearbox housing. In this case the bush is not part of the gear module. The bush can, however, also be a part of activation devices for the operation of the clutch, which activation devices are a part of the gear module. The activation devices are fastened to a gearbox housing when used in a drive.

The activation devices may be installed concentrically inside the bush.

An embodiment of the gear module according to the invention is characterized in that the gear module comprises activation devices for the operation of the clutch, which activation devices are installed concentrically inside the connecting gear wheel. This limits the axial room needed by the gear module.

A further embodiment of the gear module according to the invention is characterized in that the third rotation body is disconnectably connected via third connection devices to the brake. This enables the gear module to be incorporated in parts in a drive (first the bypass transmission and then the brake) instead of having to be incorporated in its entirety in a drive. The first, second and/or third connection devices are preferably formed by splines.

Moreover, the third rotation body is preferably formed by the annulus of the bypass transmission and the first rotation body by the sun wheel of the bypass transmission.

The brake preferably comprises a brake disc, as well as two brake shoes, of which at least one can be moved hydraulically in an axial direction by several pistons.

In an embodiment the pistons are irregularly divided over the brake disc, so that the resultant of the forces exerted by the pistons on the brake disc acts in the middle of the brake disc.

In another embodiment the brake comprises three pistons, which are divided regularly over the brake disc, with angles of about 120 degrees between the pistons. The pistons are preferably connected to each other in series by brake fluid ducts.

The pistons are preferably provided with an insert piece of heat-resistant material on the sides that are in contact with the movable brake shoe.

In another embodiment of the brake one of the brake shoes is electro-mechanically movable in an axial direction.

Moreover, the brake shoes on the side facing the brake disc are preferably hardened or provided with a durable coating, or between the brake shoes and the brake disc there are hard intermediate plates in order to be more durable.

Moreover, the brake disc near the hub is preferably provided with air blades to cool the brake disc.

The brake shoes are preferably made of aluminium. In spite of the fact that the brake shoes must be thicker than if they were made of steel in order to dissipate heat, the weight of the brake shoes is still about half the weight of steel brake shoes, so that a significant weight reduction is obtained.

Still a further embodiment of the gear module according to the invention is characterized in that the brake is such that it is disengaged when not activated. This means that no activation power is needed for the brake when the vehicle is being driven in gear so that there are also no activation losses.

The gear module preferably comprises devices that ensure that the brake is not fully engaged. An embodiment of the gear module, in which the brake is not fully engaged, is characterized in that the gear module comprises a hydraulic system to feed oil to the brake piston, which hydraulic system limits the oil pressure so that the brake is never fully engaged. A torsion spring is not needed between the brake and the third rotation body to suppress vibrations from the drive source because the brake is never fully engaged. The gear module can, however, also comprise devices that ensure that the brake does engage fully.

The brake disc of the brake is preferably fastened to the third rotation body. This means no connection devices are needed that connect the brake disc to the third rotation body and no axial bearing is needed between the first and third rotation body.

Moreover, the brake is preferably a wet-plate brake or a dry-plate brake. This means that a radial seal between the third rotation body and a section of the brake housing is saved.

A further embodiment of the gear module according to the invention is characterized in that the bypass transmission is formed by a planetary gear with a characteristic transmission ratio that is equal to 1.

The transmission ratio of the planetary gear is preferably chosen so that the brake changes its turning direction when the gear module is used in a drive in which the gear has at least four positions when changing from the 2nd to the 3rd gear or from the 3rd to the 4th gear. The transmission ratio of the planetary gear is chosen so that the brake is at least virtually fully engaged in the 2nd or 3rd gear. Fully engaged is here defined as the situation in which the brake disc is stationary.

Moreover, the first rotation body is preferably provided with left-hand teeth or the rotation bodies are provided with spur teeth.

The axial and radial bearings between the annulus and the sun wheel of the planetary gear are preferably slide bearings, and there is preferably a sealing ring between the annulus and the gearbox housing and/or between the annulus and the sun wheel.

Moreover, the connecting gear wheel is preferably provided with right-hand teeth and the connecting gear wheel is preferably fastened to the second rotation body. The latter means that no connection devices are needed between the second rotation body and the connecting gear wheel. The connection between the gear module and the drive line is then formed by the toothing of the connecting gear wheel.

The second rotation body is preferably formed by the planet carrier of the bypass transmission.

The first clutch part is preferably part of the gear module and the first clutch part comprises a flywheel to which a rigid plate is fastened, which is connected via the first connection devices to the first rotation body, and to which a flexible plate is fastened, which can be connected to the drive source.

Moreover, the first clutch part preferably comprises a pressure plate, which is axially guided in the rigid plate and is connected via a connecting element to the activation devices.

For centering purposes an end of the connecting element is preferably conical and centred in an also conical end of the pressure plate and the connecting element is connected by the other end to the activation devices.

The activation devices are preferably fastened to the connecting element. The activation devices in this case rotate together with the connecting element so that two extra sealing rings are needed. However, this saves a radial seal between the first rotation body and the housing, and a thrust bearing between the piston of the activation devices and the connecting element.

Still a further embodiment of the gear module according to the invention is characterized in that the brake comprises a brake disc and the third connection devices are formed by splines, so that there is play between both parts of the splines, which brake disc is connected via the splines to the third rotation body, and in which there is a flexible ring between both parts of the splines.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The invention will be elucidated more fully below on the basis of drawings in which an embodiment of the drive provided with the gear module according to the invention is shown.

In these drawings.

DETAILED DESCRIPTION OF THE INVENTION

Figure 1:
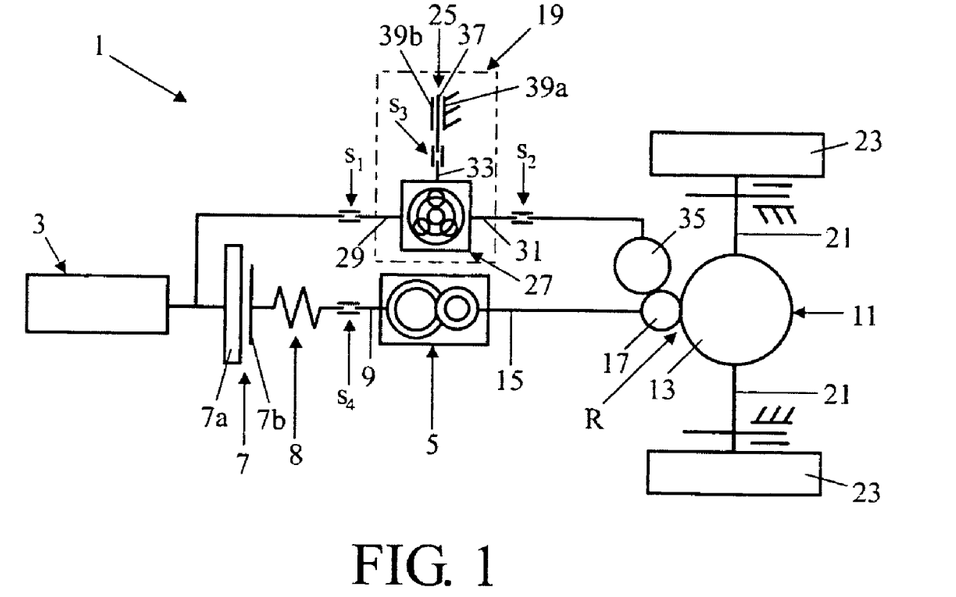
FIG. 1 is a diagram of an embodiment of the drive provided with the gear module according to the invention.
Figure 2:
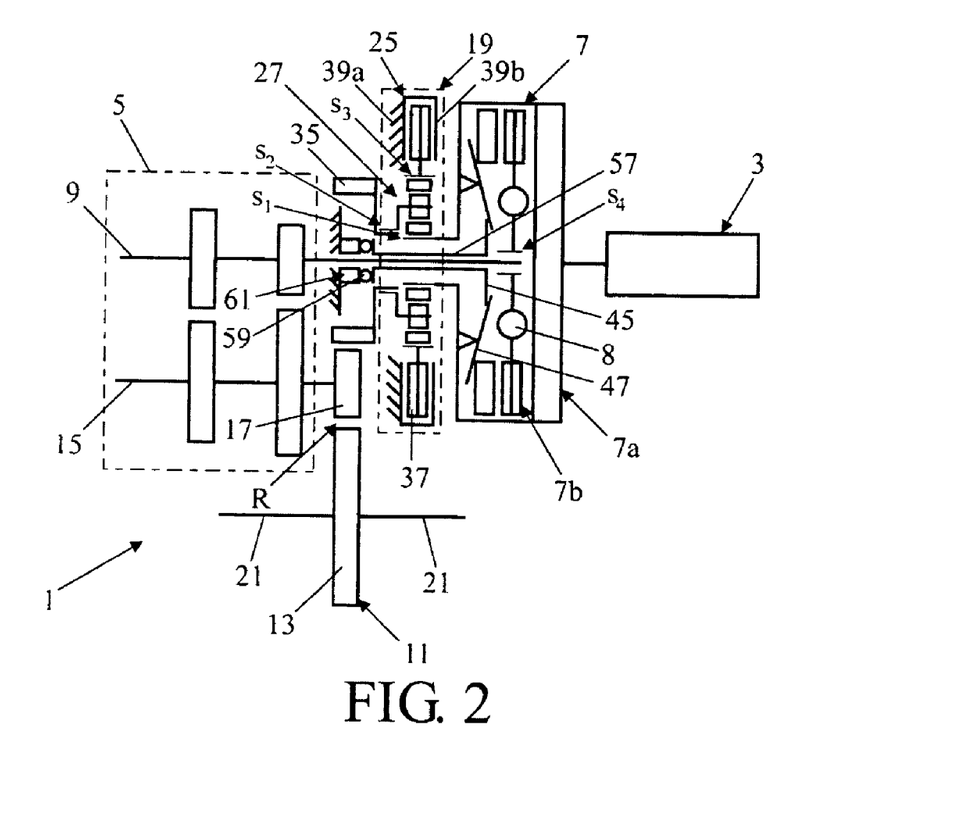
FIG. 2 shows a simplified concrete embodiment of the drive shown in FIG. 1.
Figure 3:
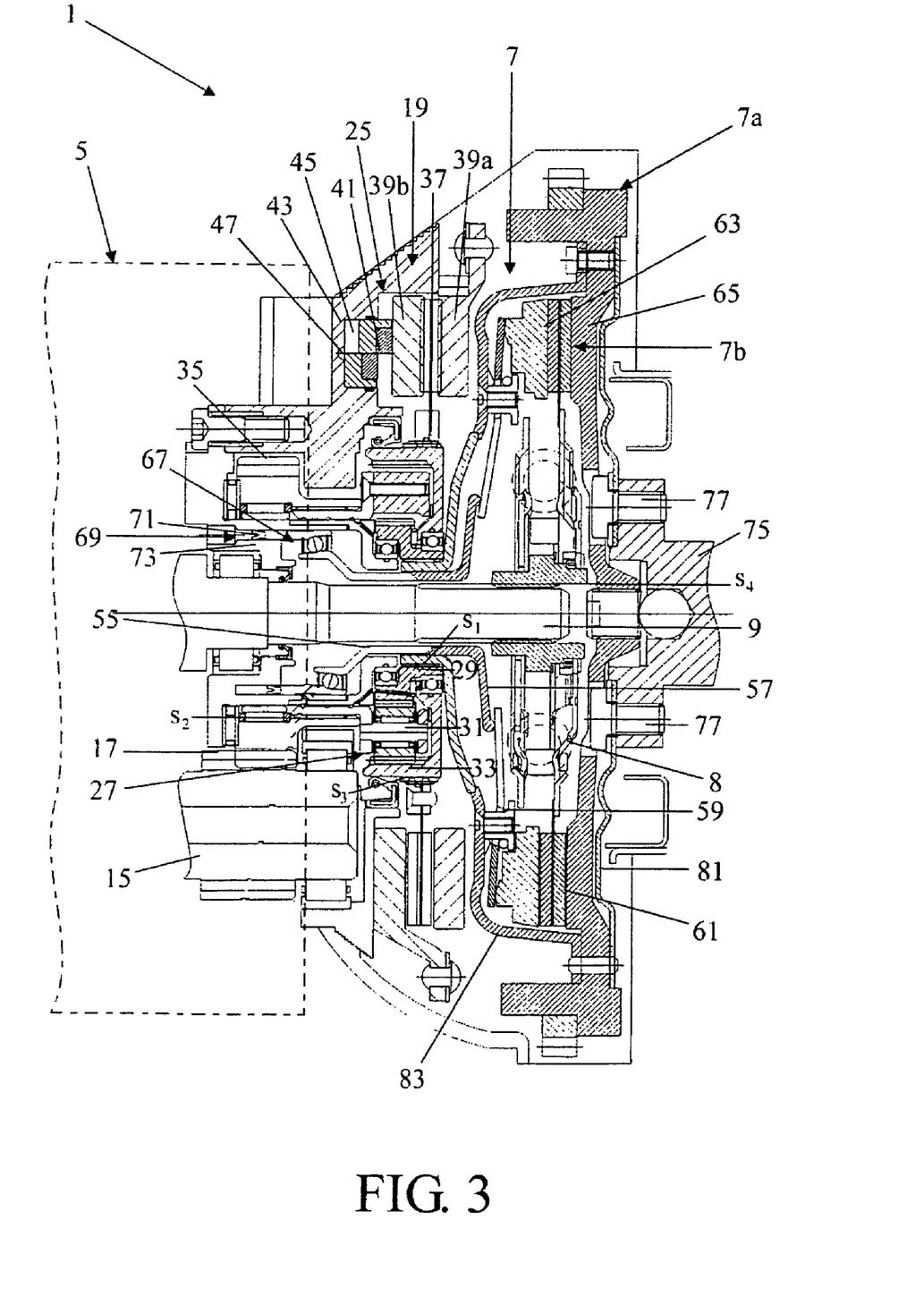
FIG. 3 shows a concrete embodiment of the simplified version shown in FIG. 2.

FIGS. 1, 2 and 3 show an embodiment of a vehicle drive provided with the gear module according to the invention as a diagram and in concrete form respectively. The drive 1 has a drive source 3 and an automatic manual gearbox 5 connected to it. The automatic gearbox 5 is adapted to be operably engaged with the drive source 3.

A friction clutch 7 is positioned between the drive source and the gearbox, of which a first clutch part 7a is connected to the drive source and the second clutch part 7b is connected via splines s4 to an input shaft 9 of the gearbox. There is a torsion spring 8 between the second clutch half 7b and the splines to suppress vibrations from the drive source 3. The drive also has a differential 11, which engages a first gear wheel 17 on the gearbox output shaft 15 with a gear wheel 13, which gear wheels 13 and 17 form an end reduction R of the drive. The differential 11 is connected via drive shafts 21 to the vehicle wheels 23. In addition, the drive has a gear module 19 to change gear without interrupting the drive.

The gear module 19 has a brake 25 and a bypass transmission 27 with three rotation bodies 29, 31, 33, of which a first rotation body 29 is connected to the first clutch part 7a, a second rotation body 31 is connected to a connecting gear wheel 35, which engages the first gear wheel 17, and the third rotation body 33 is connected to the brake 25. The connections of the rotation bodies 29, 31, 33 with the stated sections 7a, 35 and 25 respectively of the drive are made as splines s1, s2 and s3 respectively.

The brake 25 has a brake disc 37 and two brake shoes 39a and 39b. The brake shoes 39a and 39b are made of aluminium and are provided with a durable coating or are hardened on the side facing the brake disc 37. Thin, hard intermediate plates can also be used between the brake shoes 39a and 39b and the brake disc 37 instead of the durable coating. The brake shoe 39b can be moved axially by several pistons 41, which can be moved in cylindrical openings 45 in a housing section 43. The gear module has a hydraulic system (not shown) to feed oil to the pistons 41 via a brake tube 47. The hydraulic system limits the oil pressure to a value below the value at which the brake disc 37 is blocked against rotation. The brake 25 is disengaged when not activated.

Figure 4:
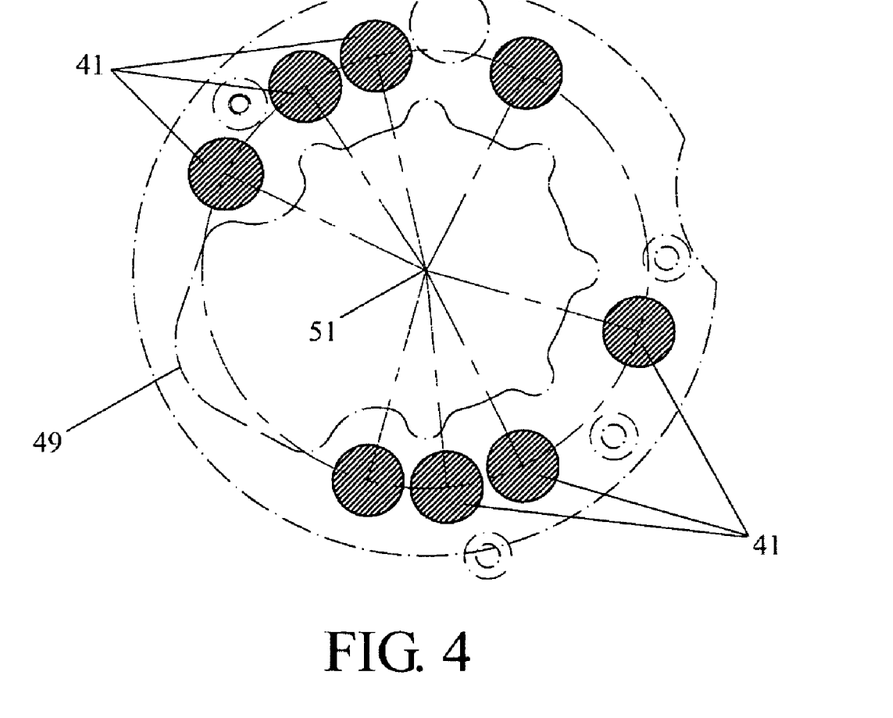
FIG. 4 shows a first possible arrangement of the pistons of the brake of the gear module.

The pistons 41 are divided irregularly over the brake disc, see FIG. 4, which shows a first possible arrangement of the pistons, and are placed next to a part of the gearbox housing 49. This means that they need no extra axial incorporation room. It has been ensured, however, that the pistons 41 are present so that the resultant of the forces exercised by the pistons 41 on the brake disc act in the middle 51 of the brake disc.

Figure 5:
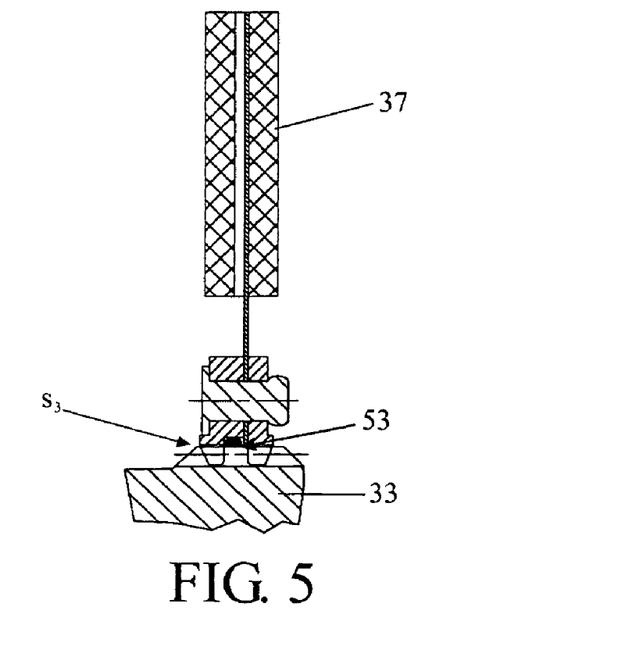
FIG. 5 shows a detail of the brake disc of the brake of the gear module.

There is play in the splines s3 between the brake disc 37 and the third rotation body 33, which is formed by an annulus of a planetary gear, see FIG. 5, which shows a detail of the brake disc, to prevent the brake disc from tilting. There is a flexible o-ring 53 between the parts of the splines to keep the brake disc 37 centred with respect to the annulus. Tilting of the brake disc 37 within the play of the splines is still possible with this. A torsion spring does not need to be present between the brake 25 and the third rotation body 33 because the brake is never completely engaged.

Figure 6:
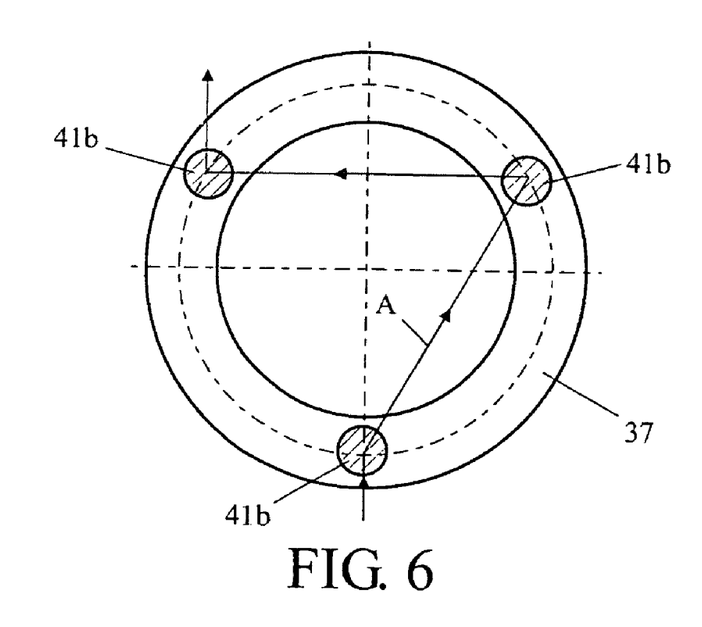
FIG. 6 shows a second possible arrangement of the pistons of the brake of the gear module.

FIG. 6 shows a second possible arrangement of the pistons. In this the brake is provided with three pistons 41b, which are distributed regularly over the brake disc 37, with angles of 120° between the pistons. The pistons 41b are connected in series by brake fluid ducts (shown by arrows A in the diagram). The pressure loss in the ducts during the performance of a free stroke is insignificant due to this (about 3 bar) compared with the working pressure (55 bar). Air pressure release from the hydraulic circuit is here only necessary directly after installation and not during use.

Figure 7:
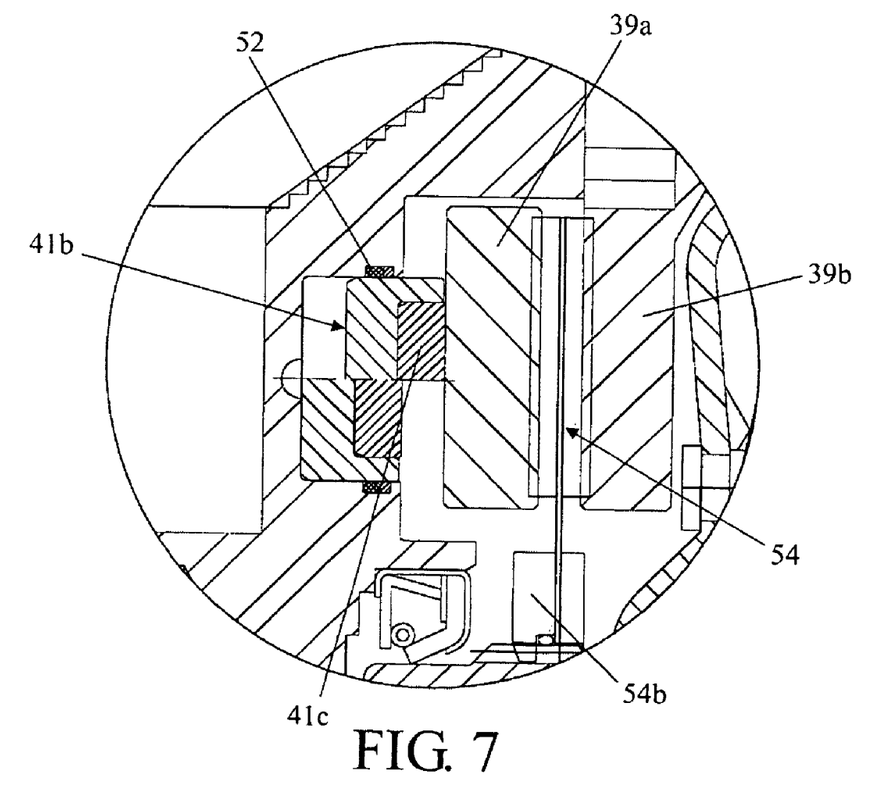
FIG. 7 shows a detail of a further embodiment of the brake of the gear module near a piston.

FIG. 7 shows a detail of a further embodiment of the brake of the gear module near a piston 41b. The piston 41b is shown in the top half in the position it occupies during braking and in the bottom position at rest. The piston 41b is also made of aluminium, as is the housing part 43, in which it can be moved, so that these parts both expand equally with a temperature rise. There is a Viton seal 52 between the piston and the housing part 43, which is resistant to a temperature of 200° C. during continual operation. The piston 41b is provided with an insert piece 41c of heat-resistant polyimide plastic on the side that is in contact with the movable brake shoes 39a. The brake disc 54 near the hub is provided with air blades 54b to cool the brake disc.

Figure 8:
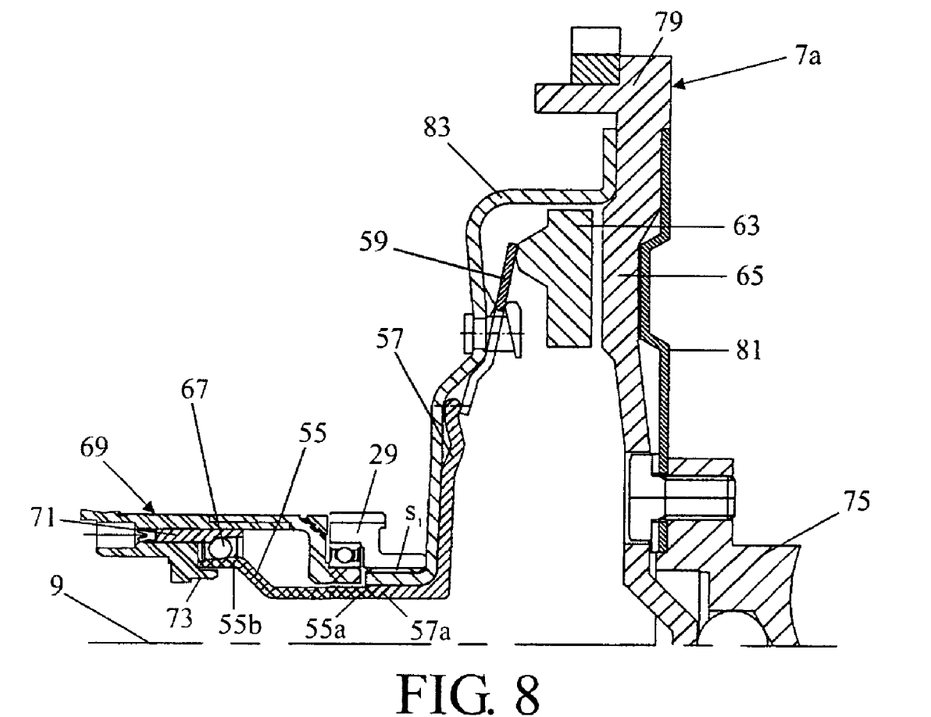
FIG. 8 shows a detail of the first clutch part of the clutch of the gear module.

FIG. 8 shows the first clutch part 7a of the clutch in detail. There is an axially movable connecting element 55 around the gearbox input shaft 9 (of which only the centre line is shown for clarity) in order to activate the clutch, which is connected by an end 55a to a pressure plate 57, which clamps a clutch plate 61 via a diaphragm spring 59, see FIG. 3, of the second clutch part 7b between two clutch parts 63 and 65 of the first clutch part 7a. The end 55a has a conical shape and is centred in an also conical end 57a of the pressure plate 57. The movable connecting element 55 is connected by the other end 55b via a thrust bearing 67 to activation devices 69 in order to activate the clutch 7. This end 55b forms one of the bearing rings of the thrust bearing 67.

These activation devices 69 are formed by a piston 71, which is movable in a hydraulic cylinder 73 that is concentric around the input shaft 9 and is fastened to a gearbox housing. The activation devices 69 are concentric within the connecting gear wheel 35 with the end reduction R, so that they take up no extra axial incorporation room. The torsion spring 8 is placed between the second clutch part 7b and the splines s4, see FIG. 3, to suppress vibrations from the drive source of which an output drive shaft 75 is connected by bolts 77 to the first clutch part 7a.

The first clutch part 7a is formed by a flywheel 79, which is connected via a flexible plate 81 to the drive shaft 75 and via a rigid plate 83 and the splines s1 is connected to the first rotation body 29.

Figure 9:
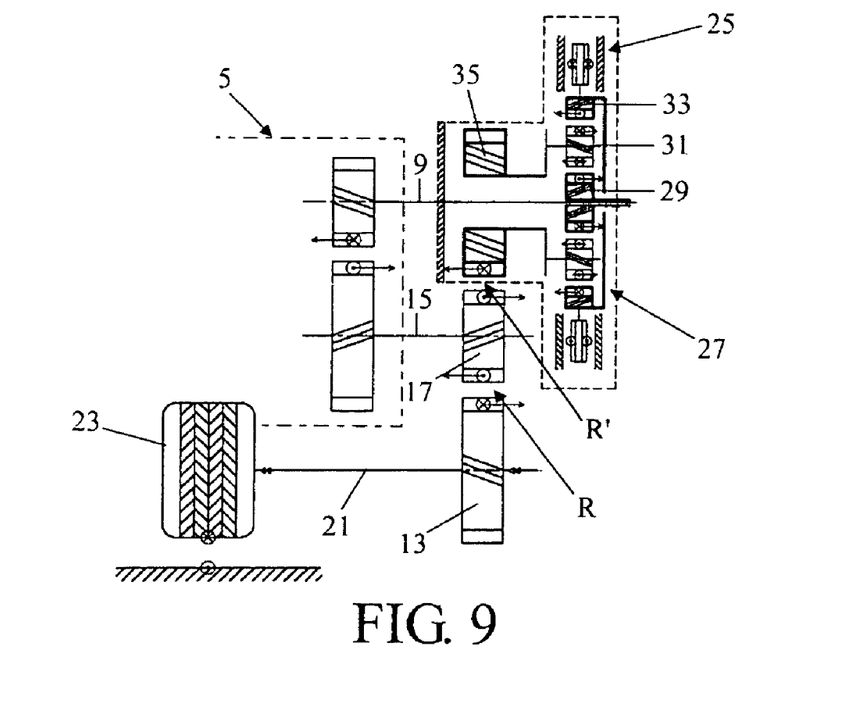
FIG. 9 is a diagram of the bypass transmission and end reduction of the gear module.

FIG. 9 is a diagram of the bypass transmission 27 and the end reduction R. The bypass transmission 27 is formed by a planetary gear in which the first rotation body 29 is formed by a sun wheel, the second rotation body 31 by a planet carrier, and the third rotation body 33 by an annulus. The direction of the tooth angle of the transmission R' between the gear wheels 13 and 17 is determined by the tooth angle direction of the existing end transmission R. The direction of the tooth angles in the planetary gear 27 has been chosen to favour the axial pressure on the bearings present if the brake 25 is activated. The sun wheel 29 is provided with left-hand teeth for this purpose. The other gear wheels in the planetary gear are adapted to this.

Figure 10:
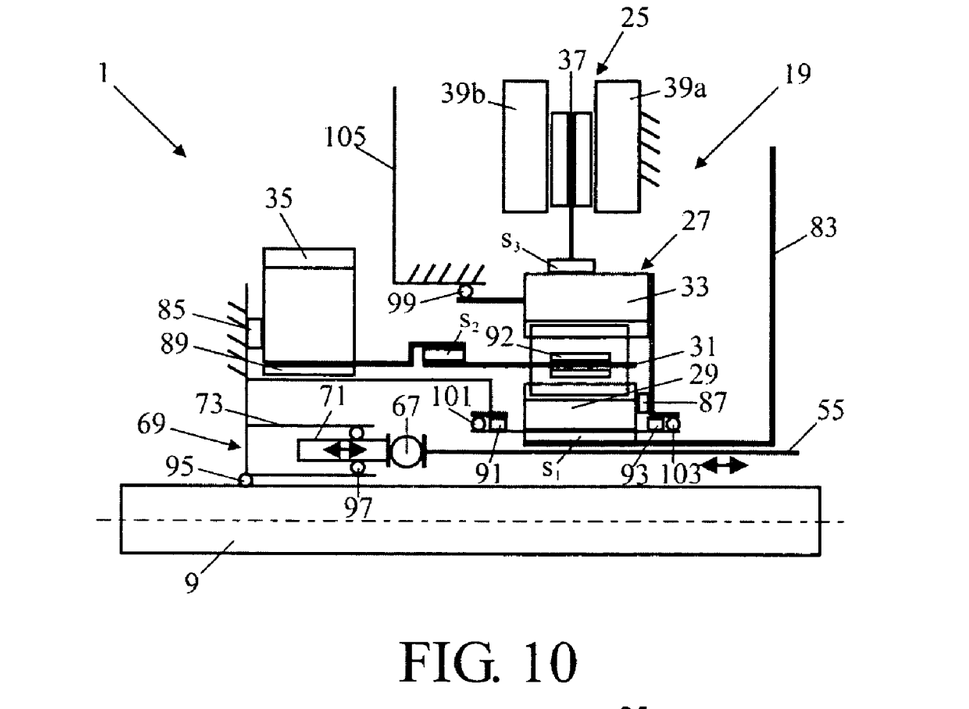
FIG. 10 is a diagram of the concrete embodiment shown in FIG. 3, which shows the splines, bearings and seals.

FIG. 10 is a diagram of the concrete embodiment shown in FIG. 3 in which the splines s1, s2 and s3, axial bearings 85 and 87, radial bearings 89, 91, 92 and 93 and seals 95, 97, 99, 101 and 103 are indicated.

Figure 11:
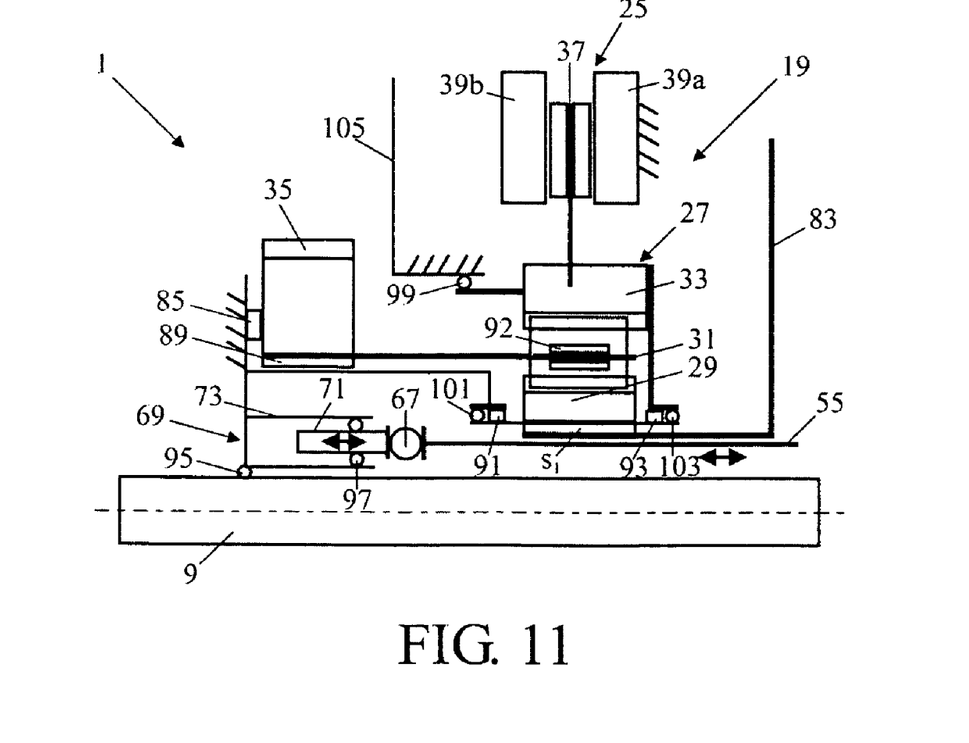
FIG. 11 is a diagram of a first simplified embodiment of the embodiment shown in FIG. 10.

FIG. 11 is a diagram of the first simplified embodiment of the embodiment shown in FIG. 10. In this the brake disc 37 of the brake 25 is fastened to the third rotation body 33. This means that the splines s3 (see FIG. 10) are saved and the axial bearing 87 (see FIG. 10) between the first and third rotation body 29, 33 can be omitted. Moreover, the connecting gear wheel 35 in this is fastened to the second rotation body 31. This means the splines s2 (see FIG. 10) are saved. The connection of the gear module 19 to the drive line is then formed by the toothing of the connecting gear wheel 35.

Figure 12:
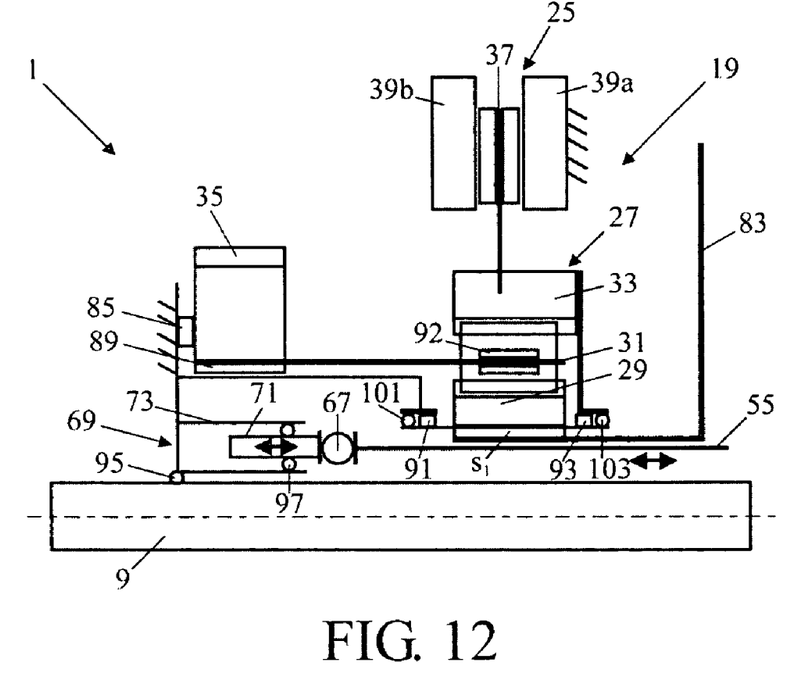
FIG. 12 is a diagram of a second simplified embodiment.

FIG. 12 is a diagram of a second simplified embodiment. In this the brake 25 is a wet-plate brake. This means the radial seal 99 (see FIG. 10) between the third rotation body 33 and a housing part 105 of the brake housing can be omitted.

Figure 13:
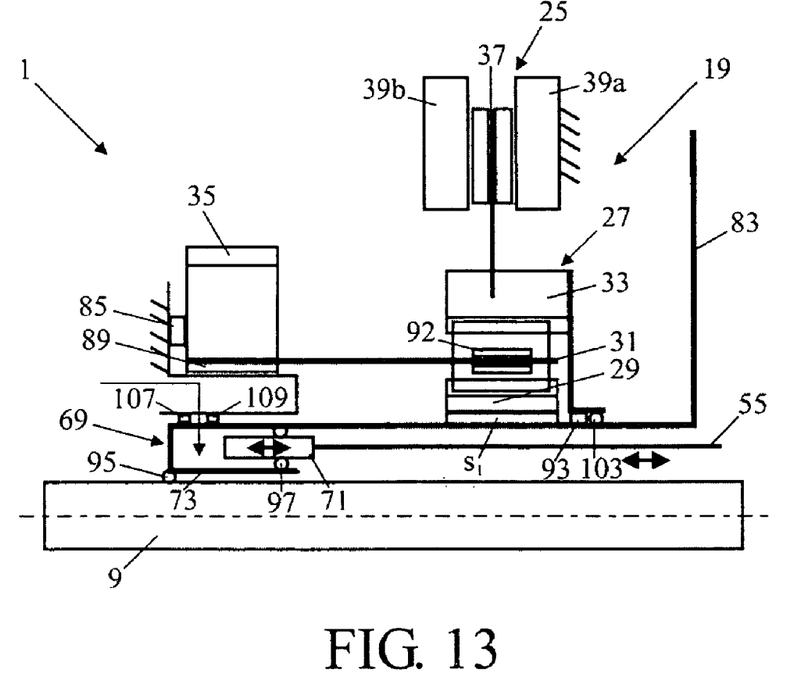
FIG. 13 is a diagram of a third simplified embodiment.

Finally, FIG. 13 is a diagram of a third simplified embodiment. In this the activation devices 69 are fastened to the connecting element 55. The activation devices in this case rotate together with the connecting element so that two extra sealing rings 107 and 109 are needed. This means that the radial seal 101 (see FIG. 10) between the first rotation body 29 and the housing can be omitted, as well as the thrust bearing 67 (see FIG. 10) between the piston 71 of the activation devices and the connecting element 55.

Figure 14:
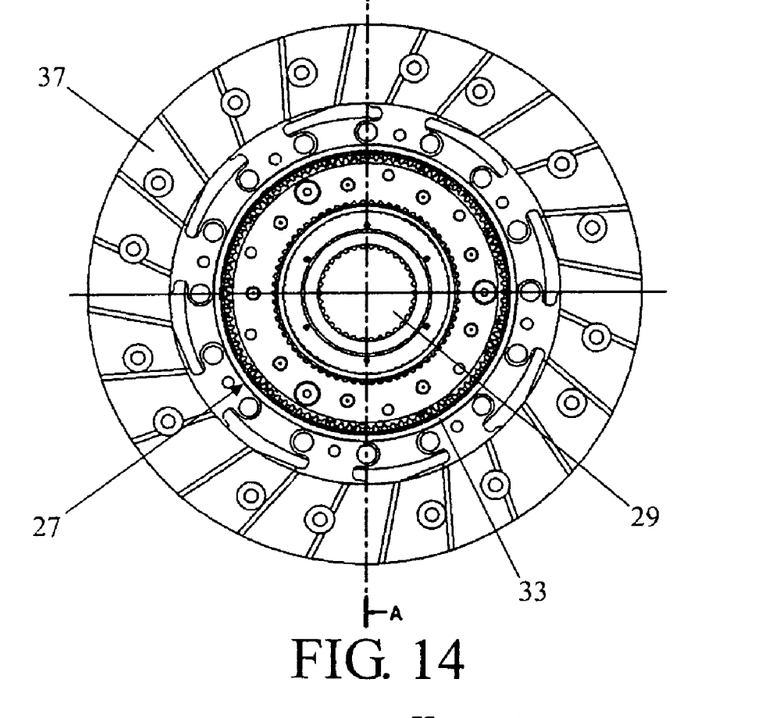
FIG. 14 shows another embodiment of the bypass transmission with the brake disc in front elevation.
Figure 15:
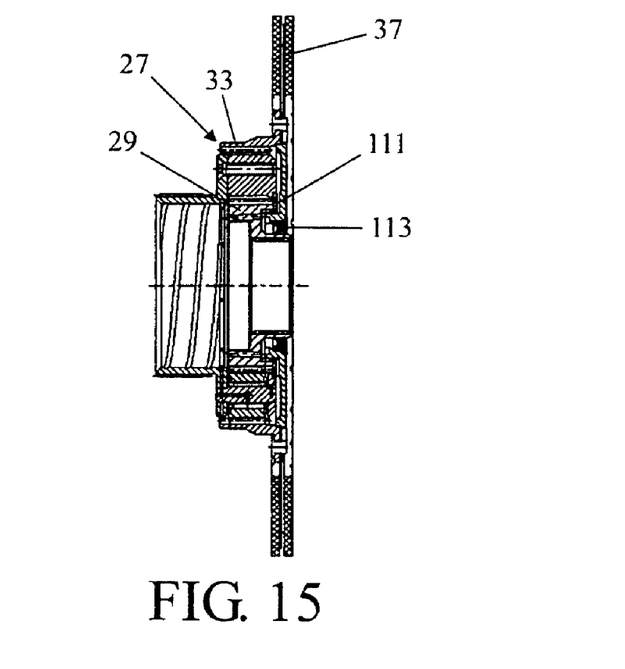
FIG. 15 shows the bypass transmission with the brake disc in cross-section along line A-A in FIG. 14.

FIGS. 14 and 15 show another embodiment of the bypass transmission 27 with the brake disc 37 in front elevation and cross-section respectively. In this the brake disc 37 is directly connected to the annulus 33 and the planetary gear 27 is provided with spur teeth. The radial/axial bearing 111 between the annulus 33 and the sun wheel 29 is provided with slide bearings instead of roller bearings. This is possible because the forces are low with the spur teeth. Moreover, there is a sealing ring 113 between the annulus 33 and the sun wheel 29.

Although in the above the invention is explained on the basis of the drawings, it should be noted that the invention is in no way limited to the embodiment shown in the drawings. The invention also extends to all embodiments deviating from the embodiment shown in the drawings within the context defined by the claims.

What is claimed is:

1. A gear module usable in a drive comprising:
    a drive source;
    an automatic gearbox connected to the drive source comprising:
    an input and an output shaft;
    a friction clutch between the drive source and the gearbox input shaft; and
    a differential connected to a first gear wheel on the gearbox output shaft, wherein the clutch has a first clutch part connected to the drive source and a second clutch part disconnectably connected to the gearbox input shaft;
a brake;
a bypass transmission having three rotation bodies, wherein a first rotation body is connected via a first plurality of connection devices to the first clutch part, a second rotation body is connected to the first gear wheel, and a third rotation body is connected to the brake; and
a connecting gear wheel, which engages the first gear wheel of the drive and which via a second plurality of connection devices is disconnectably connected to the second rotation body.

2. The gear module according to claim 1, wherein the connecting gear wheel is connected on bearings to a bush that, when the gear module in a drive is concentric to an input shaft, is fastened to a gearbox housing of the drive.

3. The gear module according to claim 2, wherein the bush is part of a plurality of activation devices for the operation of the clutch, wherein the activation devices are a part of the gear module.

4. The gear module according to claim 3, wherein the activation devices are installed concentrically inside the bush.

5. The gear module according to claim 1, characterized in that the third rotation body is disconnectedly connected to the brake via a third plurality of connection devices.

6. The gear module according to claim 1, characterized in that the first, second and third connection devices are formed by splines.

7. The gear module according to claim 1, characterized in that
the third rotation body is formed by an annulus of the bypass transmission and the first rotation body is formed by the sun wheel of the bypass transmission.

8. The gear module according to claim 1, characterized in that the brake comprises a brake disc as well as two brake shoes, of which at least one is hydraulically movable in an axial direction by several pistons.

9. The gear module according to claim 8, characterized in that the pistons are divided irregularly over the brake disc, in which the resultant of the forces exerted by the pistons on the brake disc acts in the middle of the brake disc.

10. The gear module according to claim 8, characterized in that the brake comprises three pistons, which are divided regularly over the brake disc, with angles of about 120° between the pistons.

11. The gear module according to claim 10, characterized in that the pistons are connected in series by brake fluid ducts.

12. The gear module according to claim 8, characterized in that the pistons are provided with an insert piece of heat-resistant material on the sides that are in contact with the movable brake shoe.

13. The gear module according to claim 1, characterized in that the brake comprises a brake disc as well as two brake shoes, of which at least one is movable electro-mechanically in an axial direction.

14. The gear module according to claim 8, characterized in that the brake shoes are provided with a durable coating or are hardened on the side facing the brake disc.

15. The gear module according to claim 8, characterized in that there are hard intermediate plates between the brake shoes and the brake disc.

16. The gear module according to claim 8, characterized in that the brake disc near the hub is provided with air blades to cool the brake disc.

17. The gear module according to claim 8, characterized in that the brake shoes are made of aluminum.

18. The gear module according to claim 1, characterized in that the brake is disengaged when not activated.

19. The gear module according to claim 1, characterized in that the gear module comprises devices that ensure that the brake will not be fully engaged.

20. The gear module according to claim 19, characterized in that the gear module comprises a hydraulic system to feed oil to pistons of the brake, which hydraulic system limits the oil pressure so that the brake is never fully engaged.

21. The gear module according to claim 1, characterized in that there is no torsion spring between the brake and the third rotation body.

22. The gear module according to claim 1, characterized in that the brake comprises a brake disc, which is fastened to the third rotation body.

23. The gear module according to claim 20, characterized in that the brake is a wet-plate brake or a dry-plate brake.

24. The gear module according to claim 1, characterized in that the bypass transmission is a planetary gear with a characteristic transmission ratio, which is greater than or equal to 1.

25. The gear module according to claim 24, characterized in that the transmission ratio of the planetary gear is chosen so that the brake changes its turning direction if the gear module is used in a drive in which there are at least four positions when changing from the 2nd to the 3rd gear or from the 3rd to the 4th gear.

26. The gear module according to claim 24, characterized in that the transmission ratio of the planetary gear is chosen so that the brake is at least virtually fully engaged in the 2nd or 3rd gear.

27. The gear module according to claim 24, characterized in that the first rotation body is provided with left-hand teeth.

28. The gear module according to claim 24, characterized in that the rotation bodies are provided with spur teeth.

29. The gear module according to claim 24, characterized in that the axial and radial bearing between an annulus and the sun wheel of the planetary gear is formed by slide bearings.

30. The gear module according to claim 24, characterized in that there is a sealing ring between an annulus and the gearbox housing and between the annulus and the sun wheel.

31. The gear module according to claim 1, characterized in that the connecting gear wheel is provided with right-hand teeth.

32. The gear module according to claim 1, characterized in that the connecting gear wheel is fastened to the second rotation body.

33. The gear module according to claim 1, characterized in that the second rotation body is formed by the planet carrier of the bypass transmission.

34. The gear module according to claim 1, characterized in that the first clutch part is part of the gear module and comprises a flywheel to which a rigid plate is fastened, which is connected to the first rotation body via the first connection devices, and to which a flexible plate is fastened, which can be connected to the drive source.

35. The gear module according to claim 34, characterized in that the first clutch part comprises a pressure plate, which is axially guided in the rigid plate and is connected to the activation devices via a connecting element.

36. The gear module according to claim 35, characterized in that an end of the connecting element is conical and is centred in an also conical end of the pressure plate and in that the connecting element is connected to the activation devices by the other end.

37. The gear module according to claim 35, characterized in that the activation devices are fastened to the connecting element.

38. The gear module according to claim 36, characterized in that the brake comprises a brake disc and the third connection devices are formed by splines, in which there is play between both parts of the splines, which brake disc is connected via the splines to the third rotation body, and in which there is a flexible ring between the both parts of the splines.

39. A gear module usable with a drive source, the gear module comprising:
- an automatic gearbox adapted to be operably engaged with the drive source, the automatic gearbox comprising:
  - an input and an output shaft;
  - a friction clutch between the drive source and the gearbox input shaft; and
  - a differential connected to a first gear wheel on the gearbox output shaft, wherein the clutch has a first clutch part connected to the drive source and a second clutch part disconnectably connected to the gearbox input shaft;
- a brake;
- a bypass transmission having three rotation bodies, wherein a first rotation body is connected via a first plurality of connection devices to the first clutch part, a second rotation body is connected to the first gear wheel, and a third rotation body is connected to the brake; and
- a connecting gear wheel, which engages the first gear wheel of the drive and which via a second plurality of connection devices is disconnectably connected to the second rotation body.

\* \* \* \* \*